(12) United States Patent
Akiyama et al.

(10) Patent No.: US 9,334,836 B2
(45) Date of Patent: *May 10, 2016

(54) EVAPORATION FUEL PROCESSING DEVICE

(71) Applicant: AISAN KOGYO KABUSHIKI KAISHA, Obu-shi, Aichi-ken (JP)

(72) Inventors: Takanori Akiyama, Nagoya (JP); Junya Kimoto, Obu (JP); Hiroshi Takamatsu, Chiryu (JP); Ryuji Kosugi, Obu (JP)

(73) Assignee: Aisan Kogyo Kabushiki Kaisha (JP)

( * ) Notice: Subject to any disclaimer, the term of this patent is extended or adjusted under 35 U.S.C. 154(b) by 326 days.

This patent is subject to a terminal disclaimer.

(21) Appl. No.: 13/973,028

(22) Filed: Aug. 22, 2013

(65) Prior Publication Data

US 2014/0060499 A1  Mar. 6, 2014

(30) Foreign Application Priority Data

Aug. 28, 2012  (JP) .................................. 2012-187925

(51) Int. Cl.
   *F02M 33/02* (2006.01)
   *F02M 25/08* (2006.01)
   *B01D 53/04* (2006.01)

(52) U.S. Cl.
   CPC ....... *F02M 25/0854* (2013.01); *B01D 53/0407* (2013.01); *B01D 2253/102* (2013.01); *B01D 2257/7022* (2013.01); *B01D 2259/4516* (2013.01)

(58) Field of Classification Search
   CPC .............................................. F02M 25/0854
   USPC ............ 123/516, 518, 519, 520, 698; 96/108, 96/121, 130
   See application file for complete search history.

(56) References Cited

U.S. PATENT DOCUMENTS

| | | | |
|---|---|---|---|
| 2002/0078931 A1* | 6/2002 | Makino | B01D 53/02 123/519 |
| 2004/0055468 A1* | 3/2004 | Makino | B01D 53/02 96/131 |

(Continued)

FOREIGN PATENT DOCUMENTS

| | | |
|---|---|---|
| JP | 2002-235610 A | 8/2002 |
| JP | 2007-146793 A | 6/2007 |

(Continued)

OTHER PUBLICATIONS

Office Action issued Dec. 1, 2015 in Japanese Patent Application No. 2012-187925.

*Primary Examiner* — John Kwon
(74) *Attorney, Agent, or Firm* — Wood, Phillips, Katz, Clark & Mortimer (57) ABSTRACT

The present invention provides an evaporation fuel processing device including: a passage formed inside so as to allow a fluid to flow through the passage; a tank port and a purge port formed on one end side of the passage; an atmospheric air port formed on the other end side of the passage; and adsorbent layers filled with adsorbent which can adsorb evaporation fuel components, the adsorbent layers being provided in the passage, wherein a region which is constituted of three or more adsorbent layers and separating parts for separating the adjacent adsorbent layers, and in which a total volume of the adsorbent layers is set smaller than a total volume of the separating parts, is provided on an atmospheric air port side of the passage.

10 Claims, 8 Drawing Sheets

(56) References Cited

U.S. PATENT DOCUMENTS

| | | | |
|---|---|---|---|
| 2004/0173190 A1* | 9/2004 | Makino | F02D 41/004 123/520 |
| 2006/0102156 A1* | 5/2006 | Yamauchi | B01D 53/0415 123/519 |
| 2006/0288872 A1* | 12/2006 | Nakano | B01D 53/02 96/108 |
| 2007/0119306 A1 | 5/2007 | Yamada et al. | |
| 2009/0013973 A1* | 1/2009 | Yamasaki | F02M 25/0854 123/519 |
| 2011/0240490 A1 | 10/2011 | Sugiura | |
| 2012/0073549 A1 | 3/2012 | Lee et al. | |
| 2012/0186563 A1 | 7/2012 | Hasegawa et al. | |
| 2012/0234301 A1* | 9/2012 | Takamatsu | F02M 25/0854 123/519 |
| 2013/0000610 A1* | 1/2013 | Yamamoto | F02M 25/0854 123/519 |

FOREIGN PATENT DOCUMENTS

| | | |
|---|---|---|
| JP | 2011-214554 A | 10/2011 |
| JP | 2012-072756 A | 4/2012 |
| JP | 2012-149620 A | 8/2012 |

* cited by examiner

EVAPORATION FUEL PROCESSING DEVICE

BACKGROUND OF THE INVENTION (1) Field of the Invention

The present invention relates to an evaporation fuel processing device.

(2) Description of Related Art

Conventionally, in order to prevent evaporation fuel from being discharged to the atmosphere from a fuel tank and the like of a vehicle, an evaporation fuel processing device (hereinafter also referred to as a canister) which temporarily adsorbs fuel components in the evaporation fuel has been used.

Figure 8:
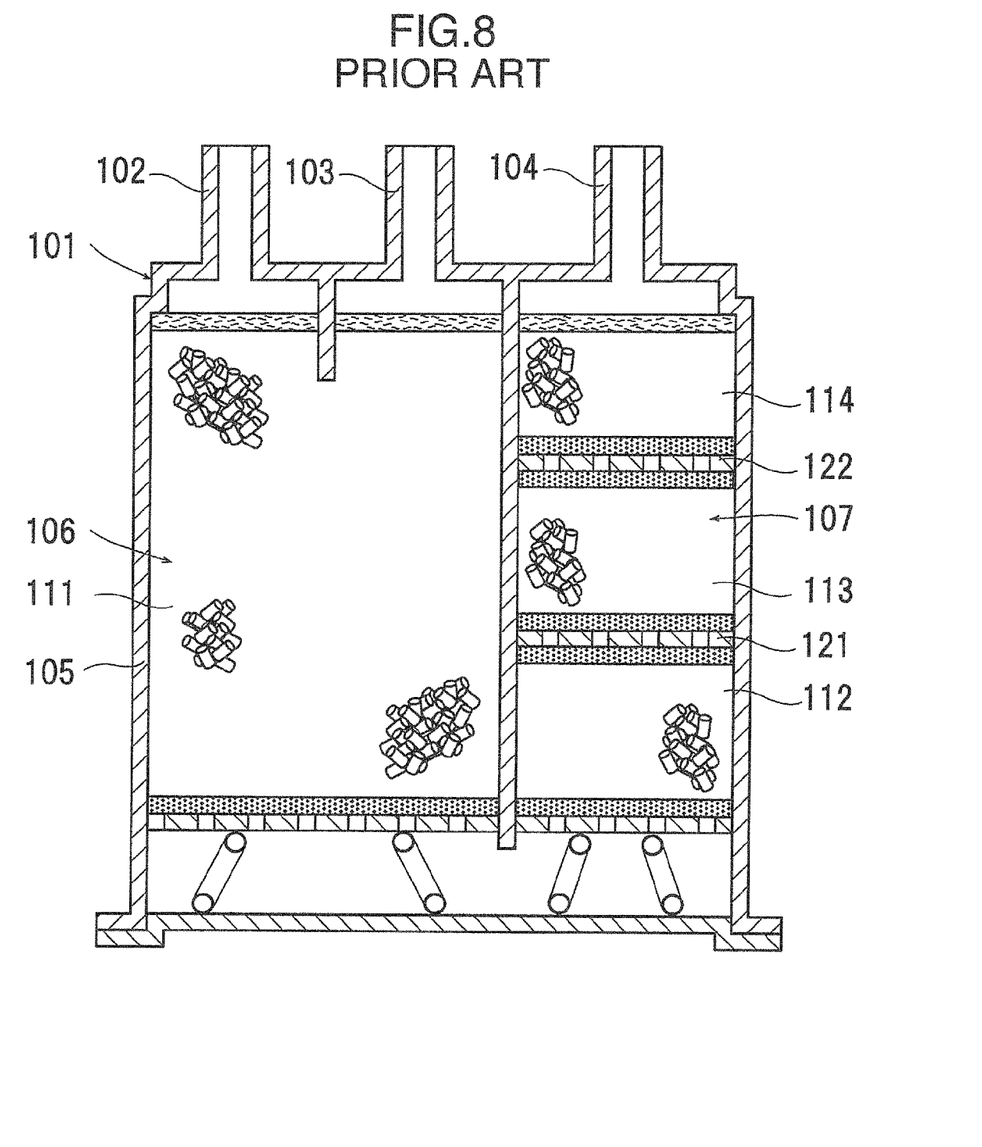
FIG. 8 is a schematic cross-sectional view showing an evaporation fuel processing device of a related art.

As such a canister, a canister 101 as shown in FIG. 8 is known (e.g., refer to JP-A-2002-235610), which includes: a case 105 formed with a tank port 102, a purge port 103, and an atmospheric air port 104; a main chamber 106 communicating with the tank port 102 and the purge port 103, and an auxiliary chamber 107 communicating with the atmospheric air port 104, the main chamber 106 and the auxiliary chamber 107 formed in the case 105 and communicating with each other in a part on an opposite side of the atmospheric air port 104; a first adsorbent layer 111 filled with activated carbon and formed in the main chamber 106; a second adsorbent layer 112, a third adsorbent layer 113, and a fourth adsorbent layer 114 filled with the activated carbon and serially disposed in the auxiliary chamber 107; and partition plates 121 and 122 disposed between the second adsorbent layer 112 and the third adsorbent layer 113, and between the third adsorbent layer 113 and the fourth adsorbent layer 114, respectively.

In this canister 101, a volume of the fourth adsorbent layer 114 is set smaller than that of the other adsorbent layers 111, 112, and 113 so as to reduce blow-by of the evaporation fuel to the atmosphere.

SUMMARY OF THE INVENTION

In the canister 101 of the related art, volumes between the second adsorbent layer 112 and the third adsorbent layer 113, and between the third adsorbent layer 113 and the fourth adsorbent layer 114 are small. For this reason, during purging, when gas temperature decreases due to desorption of fuel components from the activated carbon in the fourth adsorbent layer 114 or the third adsorbent layer 113, the reduced gas temperature hardly rises in spaces at the partition plates 122 and 121, and the gas soon flows into the adsorbent layers 113 and 112 on the tank port 102 side. Accordingly, the desorption performance in these adsorbent layers 113 and 112 is degraded, which may result in insufficient desorption of the fuel components.

As a result, a residual amount of the fuel components in the activated carbon after purging becomes large, which may cause blow-by to the atmosphere.

In view of this, the present invention has an object to provide an evaporation fuel processing device which reduces the residual amount of the fuel components in the activated carbon after purging to a greater degree than the conventional canister, and thereby reduces the blow-by of the evaporation fuel components from the atmospheric air port to the outside.

In order to achieve the above object, the present invention provides an evaporation fuel processing device including: a passage formed inside so as to allow a fluid to flow through the passage; a tank port and a purge port formed on one end side of the passage; an atmospheric air port formed on the other end side of the passage; and adsorbent layers filled with adsorbent which can adsorb evaporation fuel components, the adsorbent layers being provided in the passage, wherein a region, which is constituted of three or more adsorbent layers, and separating parts for separating the adjacent adsorbent layers, and in which a total volume of the adsorbent layers is set smaller than a total volume of the separating parts, is provided on an atmospheric air port side of the passage.

The present invention is directed to the evaporation fuel processing device described above, further wherein, in the region, a total of distances between both end surfaces of the adsorbent layers is set shorter than a total of separation distances between the adjacent adsorbent layers.

The present invention is directed to the evaporation fuel processing device described above, further wherein, in the region, the separation distance between the adjacent adsorbent layers is set longer in the separating part closer to the atmospheric air port.

The present invention is directed to the evaporation fuel processing device described above, further wherein, in the region, the volume of the separating part is set larger in the separating part closer to the atmospheric air port.

The present invention is directed to the evaporation fuel processing device described above, further wherein, in the region, the distance between the both end surfaces of the adsorbent layer is set shorter in the adsorbent layer closer to the atmospheric air port.

The present invention is directed to the evaporation fuel processing device described above, further wherein, in the region, the volume of the adsorbent layer is set smaller in the adsorbent layer closer to the atmospheric air port.

The present invention is directed to the evaporation fuel processing device described above, further wherein, in the region, the adsorbent layer located nearest to the atmospheric air port is constituted of activated carbon having a butane working capacity of 14.5 g/dL or higher in accordance with ASTM D5228.

The present invention is directed to the evaporation fuel processing device described above, wherein the adsorbent layer disposed nearest to the tank port is constituted of pulverized coal.

The present invention is directed to the evaporation fuel processing device described above, wherein the volume of the adsorbent layers in the region is 12% or less of a total volume of the adsorbent layers in the evaporation fuel processing device.

The present invention is directed to the evaporation fuel processing device described above, wherein a ratio of a cross-sectional area, perpendicular to a flow direction in the passage, of the adsorbent layers in the region to a cross-sectional area, perpendicular to the flow direction in the passage, of the adsorbent layer outside the region in the evaporation fuel processing device falls within a range of 1:2.5 to 1:4.5.

In the present invention, the region, which is constituted of the three or more adsorbent layers and the separating parts for separating the adjacent adsorbent layers, and in which the total volume of the adsorbent layers is set smaller than the total volume of the separating parts, is provided on the atmospheric air port side. Due to this configuration, residence times in the separating parts can be made longer than that of the conventional canister 101, so that an amount of rise (recovery) of the gas temperature which has decreased due to desorption becomes larger. Accordingly, the gas temperature inside the evaporation fuel processing device of the present invention can be maintained higher than in the conventional canister 101, and thereby the desorption performance of the adsorbent can be improved. Thus, by reducing the residual amount of the fuel components after purging to a greater degree than the conventional canister 101, it is possible to reduce the amount of the blow-by to the atmosphere and improve blow-by reduction performance.

DETAILED DESCRIPTION OF THE EMBODIMENTS

The embodiments of the present invention will be described with reference to the drawings.

Embodiment 1

Figure 1:
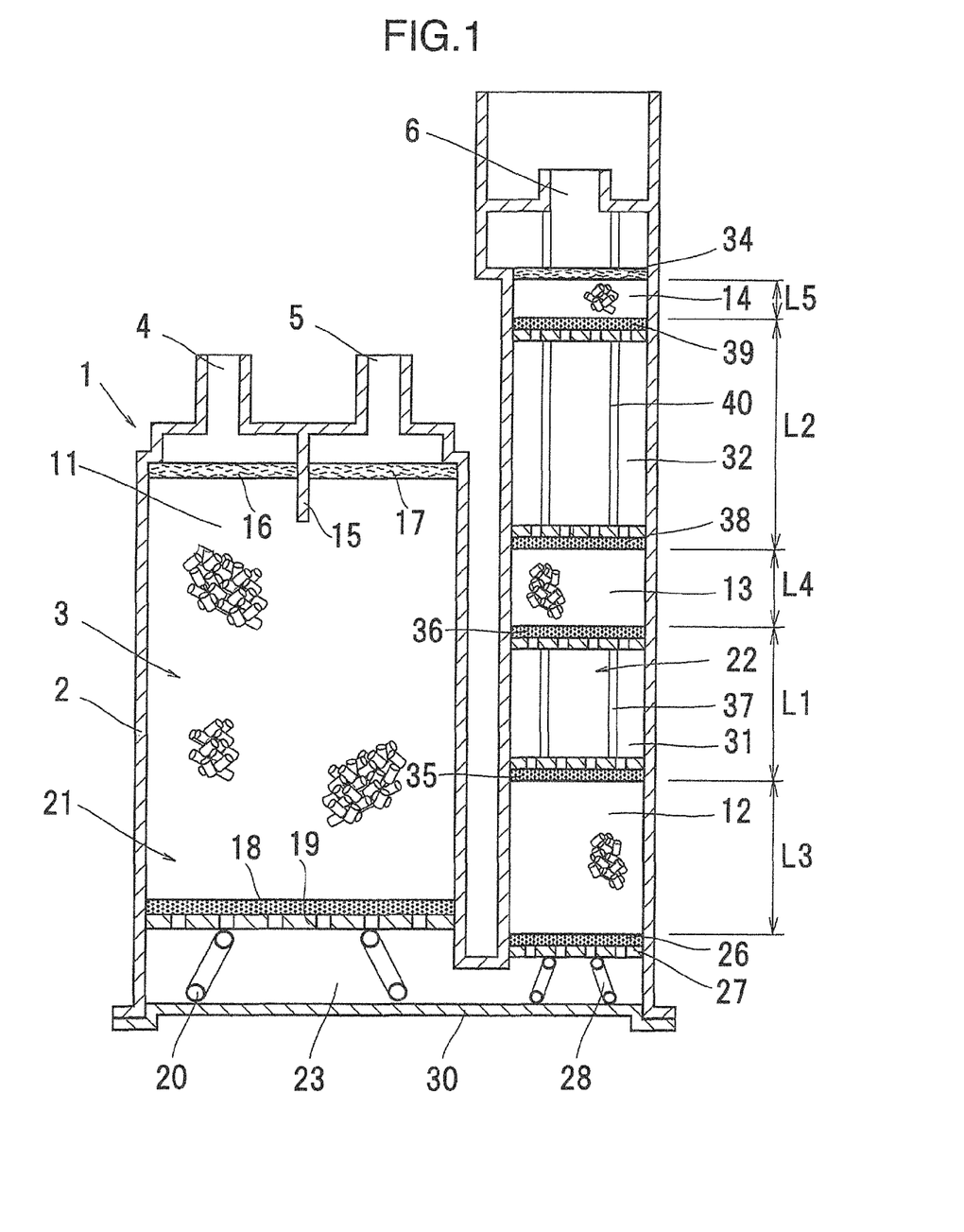
FIG. 1 is a schematic view for explaining an evaporation fuel processing device according to Embodiment 1 of the present invention.

FIG. 1 shows Embodiment 1 of the present invention.

As shown in FIG. 1, an evaporation fuel processing device 1 of the present invention includes a case 2, a passage 3 formed inside the case 2 so as to allow a fluid to flow therethrough, a tank port 4 and a purge port 5 formed at an end on one end side of the passage 3 in the case 2, and an atmospheric air port 6 formed in the end part on the other end side.

Four adsorbent layers of a first adsorbent layer 11, a second adsorbent layer 12, a third adsorbent layer 13, and a fourth adsorbent layer 14, each filled with adsorbent which can adsorb evaporation fuel components are serially disposed in the passage 3. In the present embodiment, activated carbon is used as the adsorbent.

As shown in FIG. 1, a main chamber 21 communicating with the tank port 4 and the purge port 5, and an auxiliary chamber 22 communicating with the atmospheric air port 6 are formed in the case 2. The main chamber 21 and the auxiliary chamber 22 communicate with each other through a space 23 formed in the case 2 on a side opposite to the side of an atmospheric air port 6, so as to cause the gas flowing in the passage 3 to flow in a substantially U-shape by turning around in the space 23.

The tank port 4 communicates with an upper air chamber of a fuel tank (not shown), and the purge port 5 is connected to an air intake passage of an engine through a purge control valve (VSV) (not shown). An opening degree of this purge control valve is controlled by an electronic control unit (ECU), and during engine operation, purge control is performed on the basis of measured values and the like of an A/F sensor, etc. The atmospheric air port 6 communicates with the outside through a passage (not shown).

The first adsorbent layer 11, which is filled with the activated carbon as the adsorbent at a predetermined density, is formed in the main chamber 21. While granulated coal or pulverized coal can be used as this activated carbon, pulverized coal is used in the present embodiment. To make it clear that the first adsorbent layer 11 is constituted of the activated carbon, granulated coal is shown in the figures.

A baffle plate 15 extending from an inner surface of the case 2 to a part of the first adsorbent layer 11 is disposed between the tank port 4 and the purge port 5 in the case 2. The baffle plate 15 causes the fluid flowing between the tank port 4 and the purge port 5 to pass through the first adsorbent layer 11.

The side of the tank port 4 of the first adsorbent layer 11 is covered by a filter 16 made of nonwoven fabric, etc., and the side of the purge port 5 thereof is covered by a filter 17 made of nonwoven fabric, etc. In addition, a filter 18 made of urethane, etc. is provided on a surface of the first adsorbent layer 11 on a space 23 side so as to cover the entire end surface, and a plate 19 having a plurality of communication holes is provided under the filter 18. The plate 19 is biased toward the side of the tank port 4 by biasing means 20 such as a spring.

The second adsorbent layer 12, which is filled with the activated carbon as the adsorbent at a predetermined density, is formed on the side of the space 23 of the auxiliary chamber 22. While granulated coal or pulverized coal can be used as this activated carbon, granulated coal is used in the present embodiment.

A filter 26 made of urethane, etc. is provided on the side of the space 23 of the second adsorbent layer 12 so as to cover the entire side surface. A plate 27 in which a plurality of communication holes are provided roughly evenly over the entire surface is provided on the side of the space 23 of the filter 26. The plate 27 is biased toward the side of the atmospheric air port 6 by a biasing member 28 such as a spring.

The space 23 is formed between the plates 19, 27 and a lid plate 30 of the case 2, and the first adsorbent layer 11 and the second adsorbent layer 12 communicate with each other through the space 23.

The third adsorbent layer 13, which is filled with the activated carbon as the adsorbent at a predetermined density, is formed on the side of the atmospheric air port 6 of the second adsorbent layer 12 in the auxiliary chamber 22. While granulated coal or pulverized coal can be used as this activated carbon, granulated coal is used in the present embodiment.

A first separating part 31 which separates the adsorbent layers 12 and 13 by a predetermined distance L1 is provided between the end surface of the second adsorbent layer 12 on the side of the atmospheric air port 6 and the end surface of the third adsorbent layer 13 on the side of the space 23.

The first separating part 31 is provided with filters 35 and 36 made of urethane, etc. at an end part on the side of the second adsorbent layer 12 and at an end part on the side of the third adsorbent layer 13, respectively, so as to cover the entire end parts. A space forming member 37 which can separate the filters 35 and 36 by a predetermined distance is provided between the filters 35 and 36.

The fourth adsorbent layer 14, which is filled with the activated carbon as the adsorbent at a predetermined density, is formed on the side of the atmospheric air port 6 of the third adsorbent layer 13 in the auxiliary chamber 22. While granulated coal or pulverized coal can be used as this activated carbon, in the present embodiment, high-performance activated carbon having a butane working capacity (BWC) of 14.5 g/dL or higher in accordance with ASTM D5228 is used. As the activated carbon constituting the fourth adsorbent layer 14, activated carbon similar to the activated carbon which constitutes the second adsorbent layer 12 or the third adsorbent layer 13 may be used. A filter 34 made of nonwoven fabric, etc. is provided on the side of the atmospheric air port 6 of the fourth adsorbent layer 14 so as to cover the entire end surface.

A second separating part 32 which separates the adsorbent layers 13 and 14 by a predetermined distance L2 is provided between the end surface of the third adsorbent layer 13 on the side of the atmospheric air port 6 and the end surface of the fourth adsorbent layer 14 on the side of the space 23.

The second separating part 32 is provided with the filters 38 and 39 made of urethane, etc. at an end part on the side of the third adsorbent layer 13 and at an end part on the side of the fourth adsorbent layer 14, respectively, so as to cover the entire end parts. A space forming member 40 which can separate the filters 38 and 39 by a predetermined distance is provided between the filters 38 and 39.

No adsorbent is provided in the separating parts 31 and 32. It is only necessary that the separating parts 31 and 32 can separate the adjacent adsorbent layers by a predetermined distance, so that they may be formed, for example, of only filters made of urethane, etc., or may be constituted of only the space forming members 37 and 40.

A volume V2 of the third adsorbent layer 13 is set smaller than a volume V1 of the second adsorbent layer 12, and a volume V3 of the fourth adsorbent layer 14 is set smaller than a volume V2 of the third adsorbent layer 13. That is, the volume of the adsorbent layer in the auxiliary chamber 22 is set smaller in the adsorbent layer farther on the side of the atmospheric air port 6.

A volume V5 of the second separating part 32 is set larger than a volume V4 of the first separating part 31. That is, the volume of the separating part in the auxiliary chamber 22 is set larger in the separating part farther on the side of the atmospheric air port 6.

A total volume of the adsorbent layers 12, 13, and 14 (V1+V2+V3) in the auxiliary chamber 22 is set smaller than a total volume of the separating parts 31 and 32 (V4+V5).

A distance L4 between the both end surfaces of the third adsorbent layer 13 in a flow direction in the passage 3 is set shorter than a distance L3 between the both end surfaces of the second adsorbent layer 12 in the flow direction in the passage 3, and a distance L5 between the both end surfaces of the fourth adsorbent layer 14 in the flow direction in the passage 3 is set shorter than a distance L4 between the both end surfaces of the third adsorbent layer 13 in the flow direction in the passage 3. That is, a distance between the both end surfaces of the adsorbent layer in the auxiliary chamber 22 is set smaller in the adsorbent layer farther on the side of the atmospheric air port 6.

The separation distance L2 between the third adsorbent layer 13 and the fourth adsorbent layer 14 is set longer than a separation distance L1 between the second adsorbent layer 12 and the third adsorbent layer 13. That is, the separation distance between the adjacent adsorbent layers in the auxiliary chamber 22 is set longer in the separating part farther on the side of the atmospheric air port 6.

A total of the distances between the both end surfaces of the adsorbent layers in the auxiliary chamber 22 (L3+L4+L5) in the flow direction in the passage 3 is set shorter than a total of the separation distances between the adjacent adsorbent layers (L1+L2).

The volume V4 of the first separating part 31 which is the separating part located farthest on the side of the tank port 4 is set larger than the volume V3 of the fourth adsorbent layer 14 which is the adsorbent layer located farthest on the side of the atmospheric air port 6.

The region in the embodiments of the present invention indicates a portion including the adsorbent layers 12, 13, and 14, and the separating parts 31 and 32 in the auxiliary chamber 22.

A total volume of the adsorbent layers 12, 13, and 14 (V1+V2+V3) in the auxiliary chamber 22 is set to be 12% or less of a total volume of all the adsorbent layers in the evaporation fuel processing device 1 (V0+V1+V2+V3, where a volume of the first adsorbent layer 11 is V0).

A ratio of a cross-sectional area, perpendicular to the flow direction in the passage 3, of the adsorbent layers 12, 13, and 14 in the auxiliary chamber 22 to a cross-sectional area, perpendicular to the flow direction in the passage 3, of the first adsorbent layer 11 in the main chamber 21 of the evaporation fuel processing device except for the region is set to be within a range of 1:2.5 to 1:4.5.

The cross-sectional areas of the second adsorbent layer 12, the third adsorbent layer 13, and the fourth adsorbent layer 14 perpendicular to the flow direction in the passage 3 are arbitrarily set, such as to be equal in all the layers. However, it is preferable that the cross-sectional area perpendicular to the flow direction in the passage 3 is set smaller in the adsorbent layer farther on the side of the atmospheric air port 6.

Due to the above configuration, the gas containing evaporation fuel, which has flowed into the evaporation fuel processing device 1 from the tank port 4, is discharged from the atmospheric air port 6 to the atmosphere, after the fuel components thereof is adsorbed by the adsorbent in each adsorbent layer 11 to 14.

On the other hand, at the time of purge control during engine operation, the purge control valve is opened by the electronic control unit (ECU), and air suctioned from the atmospheric air port into the evaporation fuel processing device 1 due to negative pressure in the air intake passage flows in a reverse direction from the gas, and supplied from the purge port 5 to the air intake passage of the engine. Thereby, the fuel components having been adsorbed by the adsorbent in each adsorbent layer 11 to 14 are desorbed and supplied to the engine together with the air.

Due to the above-described structure and configuration provided in the evaporation fuel processing device 1 of the present invention, the following operations and effects are obtained.

Since the total volume of the separating parts 31 and 32 (V4+V5) in the auxiliary chamber 22 is set larger than the total volume of the adsorbent layers 12, 13, and 14 (V1+V2+V3), the residence time in the separating parts can be made longer than in the conventional canister 101, so that an amount of rise (recovery) of the gas temperature which has decreased due to desorption in one of the adsorbent layer becomes larger. Accordingly, the temperature of the gas flowing into the adsorbent layer located on the tank port 4 side of the one adsorbent layer can be maintained higher than in the conventional canister 101, and thereby high performance of the adsorbent for desorbing the evaporation fuel components can be maintained. Thus, by reducing the residual amount of the fuel components in the evaporation fuel processing device 1 after purging to a greater degree than the conventional canister 101, it is possible to reduce the amount of blow-by to the atmosphere and improve the blow-by reduction performance.

Since the total volume of the separating parts 31 and 32 (V4+V5) in the auxiliary chamber 22 is set larger than the total volume of the adsorbent layers 12, 13, and 14 (V1+V2+

V3), and the total of the separation distances between the adjacent adsorbent layers (L1+L2) is set longer than the total of the distances between the both end surfaces of the adsorbent layers (L3+L4+L5), the residence time in the separating parts can be more reliably increased, and the amount of recovery of the gas temperature which has decreased due to desorption can be reliably increased to a greater degree than the conventional canister 101. Thus, by maintaining high desorption performance of the adsorbent, it is possible to reduce the residual amount of the evaporation fuel components after purging and to improve the blow-by reduction performance.

Since the volume of the adsorbent layer in the auxiliary chamber 22 is set smaller in the adsorbent layer farther on the side of the atmospheric air port 6, the residual amount of the fuel components after purging can be reduced to a greater degree in the adsorbent layer farther on the side of the atmospheric air port 6. Thereby, it is possible to reduce the blow-by of the fuel components to the atmosphere and improve the blow-by reduction performance.

In addition, since the volume of the adsorbent layer in the auxiliary chamber 22 is set smaller in the adsorbent layer farther on the side of the atmospheric air port 6, and the distance between the both end surfaces of the adsorbent layer is set shorter in the adsorbent layer farther on the side of the atmospheric air port 6, it is possible to further reduce the blow-by of the fuel components to the atmosphere and improve the blow-by reduction performance.

During purging, a temperature difference between the gas flowing into and out of the adsorbent layer is larger in the adsorbent layer closer to the atmospheric air port 6. For this reason, if the residence time can be made longer in the separating part located farther on the side of the atmospheric air port where a temperature decrease is large, and the reduced gas temperature can be increased, then high desorption performance of the adsorbent can be maintained, so that the desorption efficiency of the evaporation fuel components from the adsorbent in the adsorbent layer on the side of the tank port 4 of the separating part can be improved. Therefore, in the present invention, the volume of the separating parts 31 and 32 are set larger in the separating part closer to the atmospheric air port 6 where the temperature decrease is large, so as to make the residence time in the separating part longer in the separating part farther on the side of the atmospheric air port 6. Thereby, it has become possible to maintain the gas temperature higher than in the conventional canister 101 and to improve the desorption performance of the evaporation fuel processing device 1. Accordingly, the blow-by of the fuel components to the atmosphere can be reduced to a greater degree than in the conventional canister 101, and the blow-by reduction performance can be increased.

The volumes of the separating parts 31 and 32 are set larger in the separating part farther on the side of the atmospheric air port 6 and the separation distance between the adjacent adsorbent layers is set longer in the separating part farther on the side of the atmospheric air port 6. Thereby, the residence time in the separating parts can be made longer and the amount of rise of the reduced gas temperature can be made larger than in the conventional canister 101, so that the desorption performance of the evaporation fuel processing device 1 can be improved. Thus, it is possible to reduce the blow-by to the atmosphere to a greater degree than the conventional canister 101 and to improve the blow-by reduction performance.

Since the cross-sectional area perpendicular to the flow direction in the passage 3 is made smaller in the adsorbent layer farther on the side of the atmospheric air port 6, the flow rate of the gas per unit area during purging can be made higher in the adsorbent layer farther on the side of the atmospheric air port 6, and the residual amount of the evaporation fuel components in the fourth adsorbent layer 14 can be reduced. Thereby, it is possible to reduce the blow-by to the atmosphere and improve the blow-by reduction performance.

Embodiment 2

Figure 2:
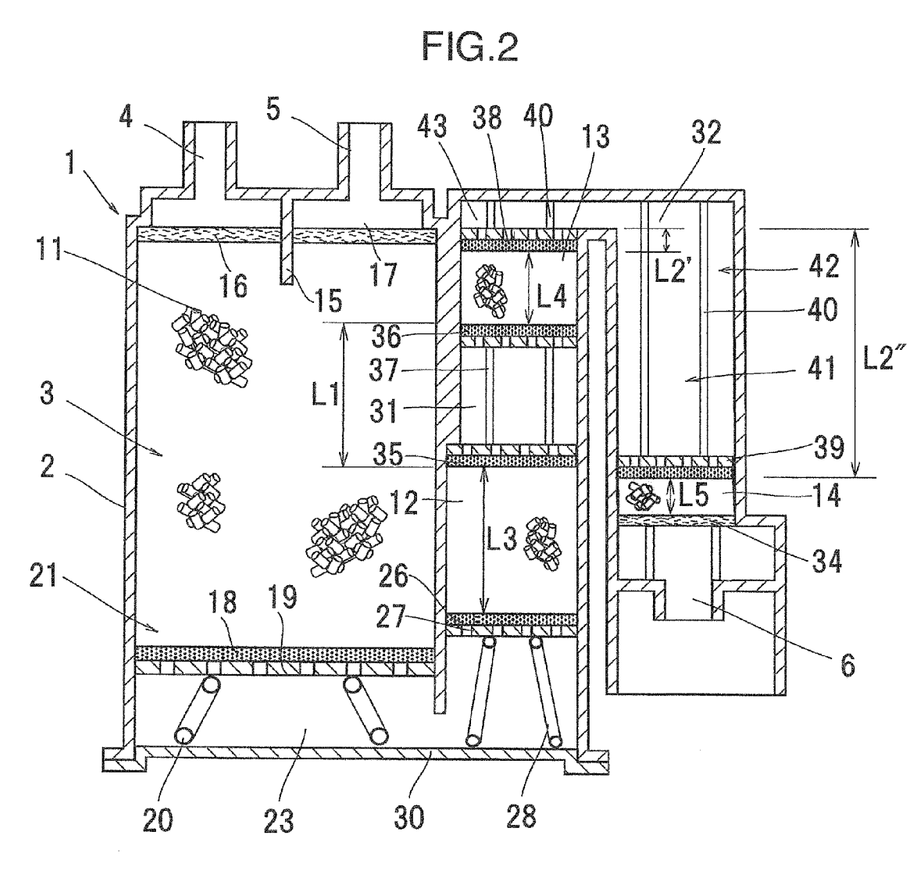
FIG. 2 is a schematic view for explaining an evaporation fuel processing device according to Embodiment 2 of the present invention.

While in Embodiment 1, the U-shaped passage 3 which is folded back once in the space 23 is formed in the case 2, for example, a passage 41 formed in an N-shape which is folded back twice may be provided in the case 2 as shown in FIG. 2.

The structure of the main chamber 21 in Embodiment 2 is the same as that of the main chamber 21 in Embodiment 1. In Embodiment 2, an auxiliary chamber 42 corresponding to the region in claim 1 is formed in a U-shape which is folded back in a space 43. One end of the auxiliary chamber 42 communicates with the space 23, and the other end is provided with the atmospheric air port 6.

The second adsorbent layer 12 and the third adsorbent layer 13 similar to those in Embodiment 1 are provided between the spaces 23 and 43 in the auxiliary chamber 42, and the first separating part 31 is formed between the second adsorbent layer 12 and the third adsorbent layer 13. In addition, the fourth adsorbent layer 14 similar to the fourth adsorbent layer 14 of Embodiment 1 is provided on the side of the atmospheric air port 6 of the space 43. The second separating part 32 is provided between the fourth adsorbent layer 14 and the third adsorbent layer 13.

Mutual relationships among the adsorbent layers 11, 12, 13, and 14, and the separating parts 31 and 32 are set in a similar manner to Embodiment 1. That is, as in Embodiment 1, the volume of the adsorbent layer in the auxiliary chamber 42 is set smaller in the adsorbent layer farther on the side of the atmospheric air port 6, the volume of the separating part in the auxiliary chamber 42 is set larger in the separating part farther on the side of the atmospheric air port 6, and the total volume of the adsorbent layers 12, 13, and 14 (V1+V2+V3) in the auxiliary chamber 42 is set smaller than the total volume of the separating parts 31 and 32 (V4+V5).

In addition, as in Embodiment 1, the distance between the both end surfaces of the adsorbent layer in the auxiliary chamber 42 is set shorter in the adsorbent layer farther on the side of the atmospheric air port 6, the separation distance between the adjacent adsorbent layers in the auxiliary chamber 42 is set longer in the separating part farther on the side of the atmospheric air port 6, and the total of the distances between the both end surfaces of the adsorbent layers (L3+L4+L5) in the auxiliary chamber 42 is set shorter than the total of the separation distances between the adjacent adsorbent layers (L1+L2). The separation distance L2 between the third adsorbent layer 13 and the fourth adsorbent layer 14 means the separation distance in an axial direction between the end surface of the third adsorbent layer 13 on the side of the atmospheric air port 6 and the end surface of the fourth adsorbent layer 14 on the side of the tank port 4. As shown in FIG. 2, the separation distance L2 corresponds to a total distance L2'+L2", where L2' is a distance between the end surface of the third adsorbent layer 13 on the side of the atmospheric air port 6 and an inlet end on the end surface of the space 43 on the side of the tank port 4, and L2" is a distance between the end surface of the space 43 on the side of the atmospheric air port 6 and the end surface of the fourth adsorbent layer 14 on the side of the tank port 4.

The volume V4 of the first separating part 31 which is the separating part located farthest on the side of the tank port 4 is set larger than the volume V3 of the fourth adsorbent layer 14 which is the adsorbent layer located farthest on the side of the atmospheric air port 6.

The total volume of the adsorbent layers 12, 13, and 14 in the auxiliary chamber 22 (V1+V2+V3) is set to be 12% or less of the total volume of all the adsorbent layers in the evaporation fuel processing device 1 (V0+V1+V2+V3).

A ratio of the cross-sectional area, perpendicular to the flow direction in the passage 3, of the adsorbent layers 12, 13, and 14 in the auxiliary chamber 42 to the cross-sectional area, perpendicular to the flow direction in the passage 3, of the first adsorbent layer 11 in the main chamber 21 of the evaporation fuel processing device except for the region is set to be within a range of 1:2.5 to 1:4.5.

Other members, which are the same as those in Embodiment 1, are denoted by the same reference numerals and a description thereof is omitted here.

In addition, the same operations and effects as in Embodiment 1 are obtained also in Embodiment 2.

Embodiment 3

Figure 3:
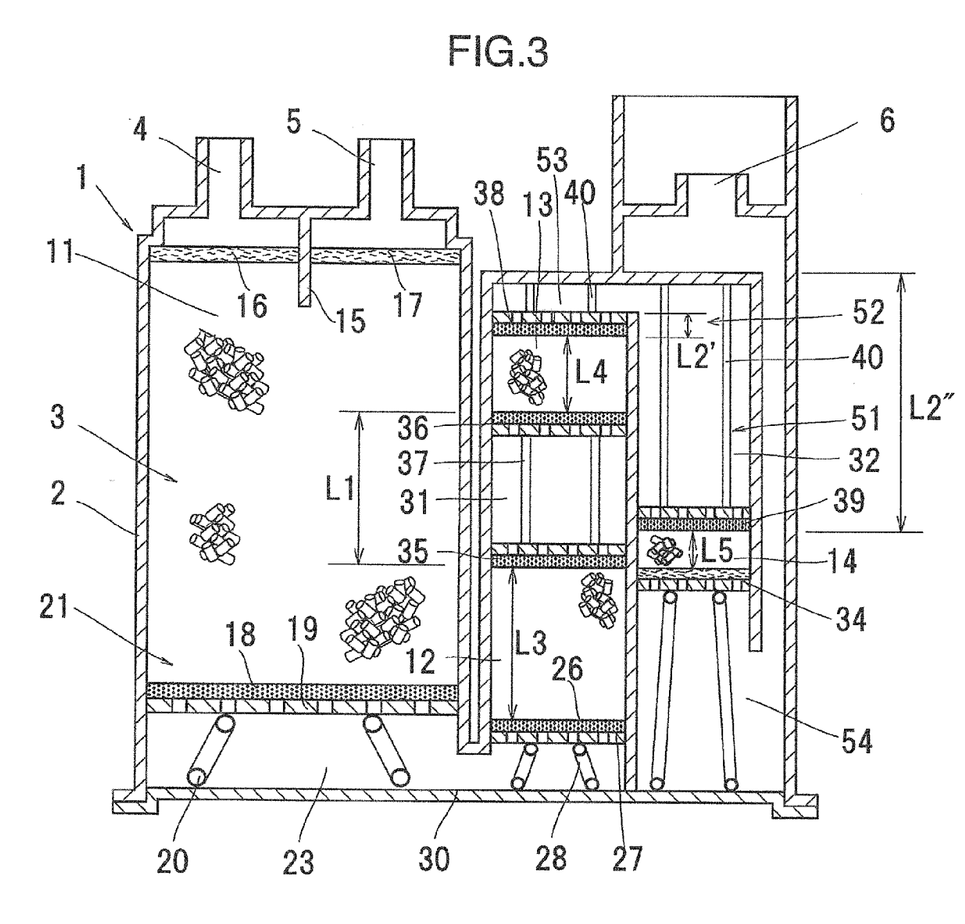
FIG. 3 is a schematic view for explaining an evaporation fuel processing device according to Embodiment 3 of the present invention.

A shape of a passage in Embodiment 3 is different from that of the passages 3 and 41 of Embodiments 1 and 2, and for example, a passage 51 formed in a W-shape which is folded back three times may be provided in the case 2 as shown in FIG. 3.

The structure of the main chamber 21 in Embodiment 3 is the same as that of the main chamber 21 in Embodiment 1. An auxiliary chamber 52 in Embodiment 3 corresponding to the region in claim 1 is formed in an N-shape which is folded back twice in spaces 53 and 54. One end of the auxiliary chamber 52 communicates with the space 23, and the other end is provided with the atmospheric air port 6.

The second adsorbent layer 12 and the third adsorbent layer 13 similar to those in Embodiment 1 are provided between the spaces 23 and 35 in the auxiliary chamber 52, and the first separating part 31 is provided between the second adsorbent layer 12 and the third adsorbent layer 13. In addition, the fourth adsorbent layer 14 similar to the fourth adsorbent layer 14 of Embodiment 1 is provided between the spaces 53 and 54. The second separating part 32 is provided between the fourth adsorbent layer 14 and the third adsorbent layer 13.

Mutual relationships among the adsorbent layers 11, 12, 13, and 14, and the separating parts 31 and 32 are set in a similar manner to Embodiment 1.

Other members, which are the same as those in Embodiments 1 and 2, are denoted by the same reference numerals and a description thereof is omitted here.

In addition, the same operations and effects as in Embodiments 1 and 2 are obtained also in Embodiment 3.

Embodiment 4

Figure 4:
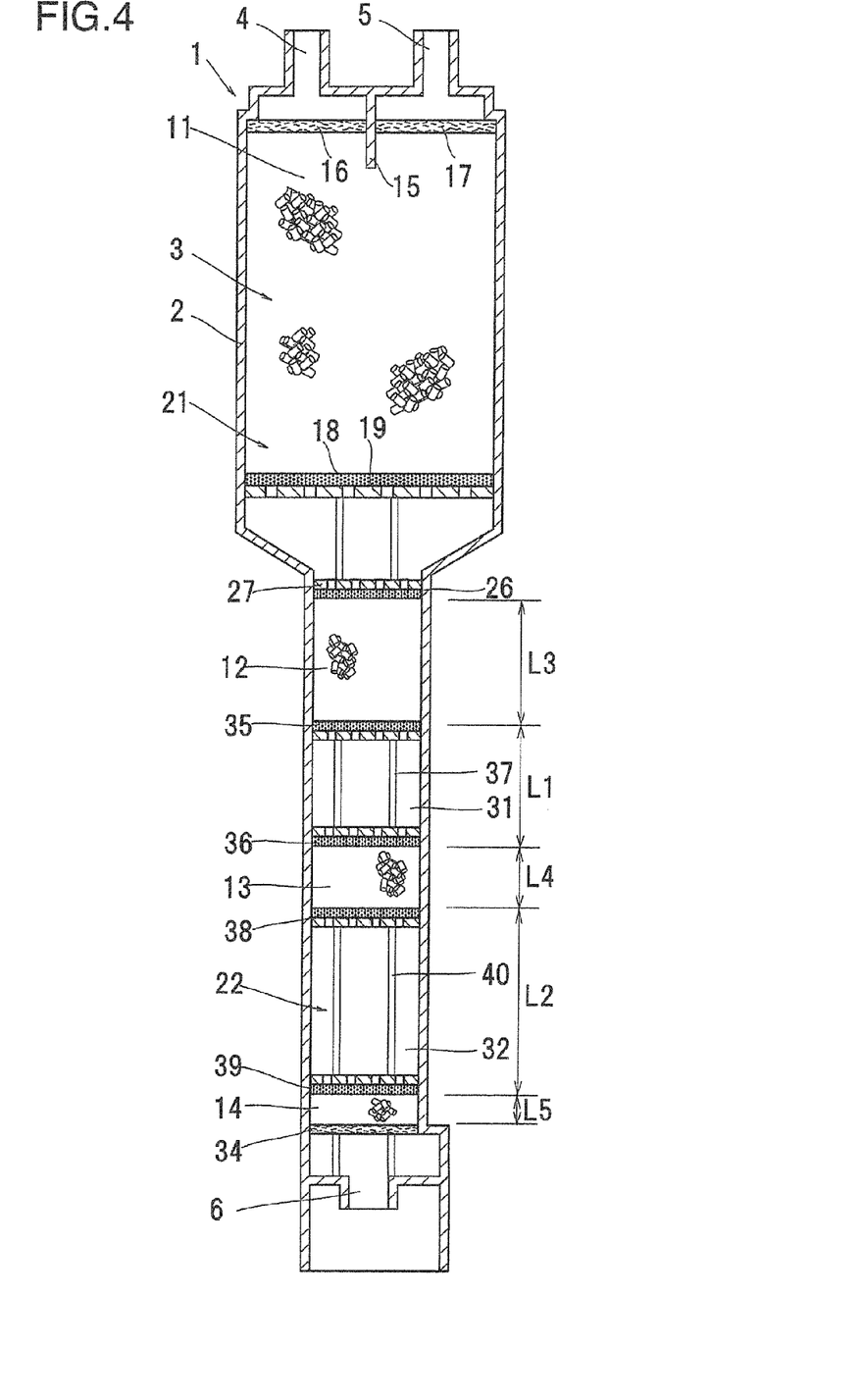
FIG. 4 is a schematic view for explaining an evaporation fuel processing device according to Embodiment 4 of the present invention.

While in Embodiment 1, the passage 3 in the case 2 is formed in a U-shape which is folded back once in the space 23, for example, as shown in FIG. 4, the passage in the case may be formed in an I-shape without folding back.

For example, as shown in FIG. 4, Embodiment 4 is an evaporation fuel processing device in which the main chamber 21 and the auxiliary chamber 22 are linearly arranged without folding back in the space.

Also in Embodiment 4, an auxiliary chamber, which is the region which includes the three adsorbent layers and the separating parts for separating the adjacent adsorbent layers, and in which the volume of the adsorbent layer is set smaller in the adsorbent layer closer to the atmospheric air port 6, the volume of the separating part is set larger in the separating part closer to the atmospheric air port; and the volume of the separating part located farthest on the tank port side is set larger than the volume of the adsorbent layer located farthest on the side of the atmospheric air port, is provided on the side of the atmospheric air port 6.

Mutual relationships between the adsorbent layers 11, 12, 13 and 14, and the separating parts 31 and 32 are set in a similar manner to Embodiment 1.

Other members which are the same as those in Embodiment 1 are denoted by the same reference numerals and a description thereof is omitted here.

In addition, the same operations and effects as in Embodiment are obtained also in Embodiment 4.

Embodiment 5

Figure 5:
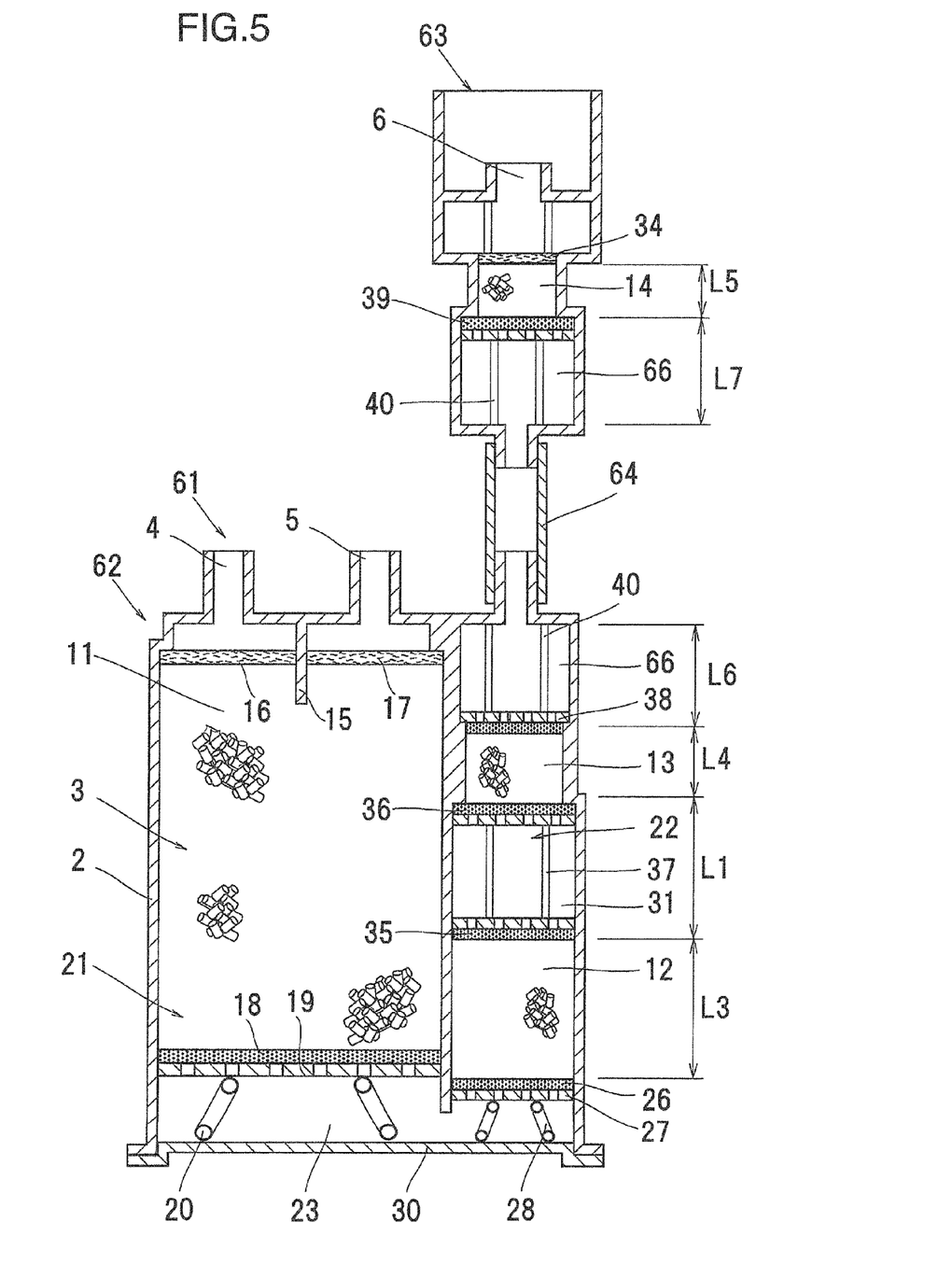
FIG. 5 is a schematic view for explaining an evaporation fuel processing device according to Embodiment 5 of the present invention.

FIG. 5 shows one example of Embodiment 5 of the present invention.

An evaporation fuel processing device 61 of Embodiment 5 includes a main body canister 62 and a sub-canister 63, and the main body canister 62 and the sub-canister 63 communicate with each other through a communication pipe 64.

As in Embodiment 1, the main chamber 21 and the auxiliary chamber 22 are formed in the main body canister 62, the first adsorbent layer 11 is provided in the main chamber 21, the second adsorbent layer 12 and the third adsorbent layer 13 similar to those in Embodiment 1 are provided in the auxiliary chamber 22, and the first separating part 31 is provided between the second adsorbent layer 12 and the third adsorbent layer 13. In addition, the fourth adsorbent layer 14 similar to that of Embodiment 1 is provided in the sub-canister 63. A second separating part 66 is provided between the third adsorbent layer 13 and the fourth adsorbent layer 14 across the auxiliary chamber 22 and the sub-canister 63.

The auxiliary chamber 22 in the main body canister 62 and the sub-canister 63 correspond to the region in claim 1.

Mutual relationships among the adsorbent layers 11, 12, 13, and 14, and the separating parts 31 and 66 are set in a similar manner to Embodiment 1. In these mutual relationships, a distance between the spaces except for the communication pipe 64, namely, L6+L7 in FIG. 5, is preferably used as the separation distance L2 between the third adsorbent layer 13 and the fourth adsorbent layer 14 in forming the adsorbent layers 11, 12, 13, and 14, and the separating parts 31 and 66 so that the mutual relationships in Embodiment 1 are established. This is because in the communication pipe 64, which has a small cross-sectional area of flow path, the flow velocity increases and the residence time in that part becomes short.

Other members which are the same as those in Embodiments 1 are denoted by the same reference numerals and a description thereof is omitted here.

In addition, the same operations and effects as in Embodiment 1 are obtained also in Embodiment 5.

Embodiment 6

In Embodiments 1 to 5, the volume of the adsorbent layer in the region is set smaller in the adsorbent layer farther on the side of the atmospheric air port 6. In this region, mutual relationships among the volumes of the adsorbent layers 12, 13, and 14 are arbitrarily set, as long as the total volume of the adsorbent layers 12, 13, and 14 (V1+V2+V3) is set smaller than the total volume of the separating parts 31 and 32 (V4+V5), and preferably, the total of the distances between the both end surfaces of the adsorbent layers in the auxiliary chamber 42 (L3+L4+L5) is set shorter than the total of the separation distances between the adjacent adsorbent layers (L1+L2).

Figure 6:
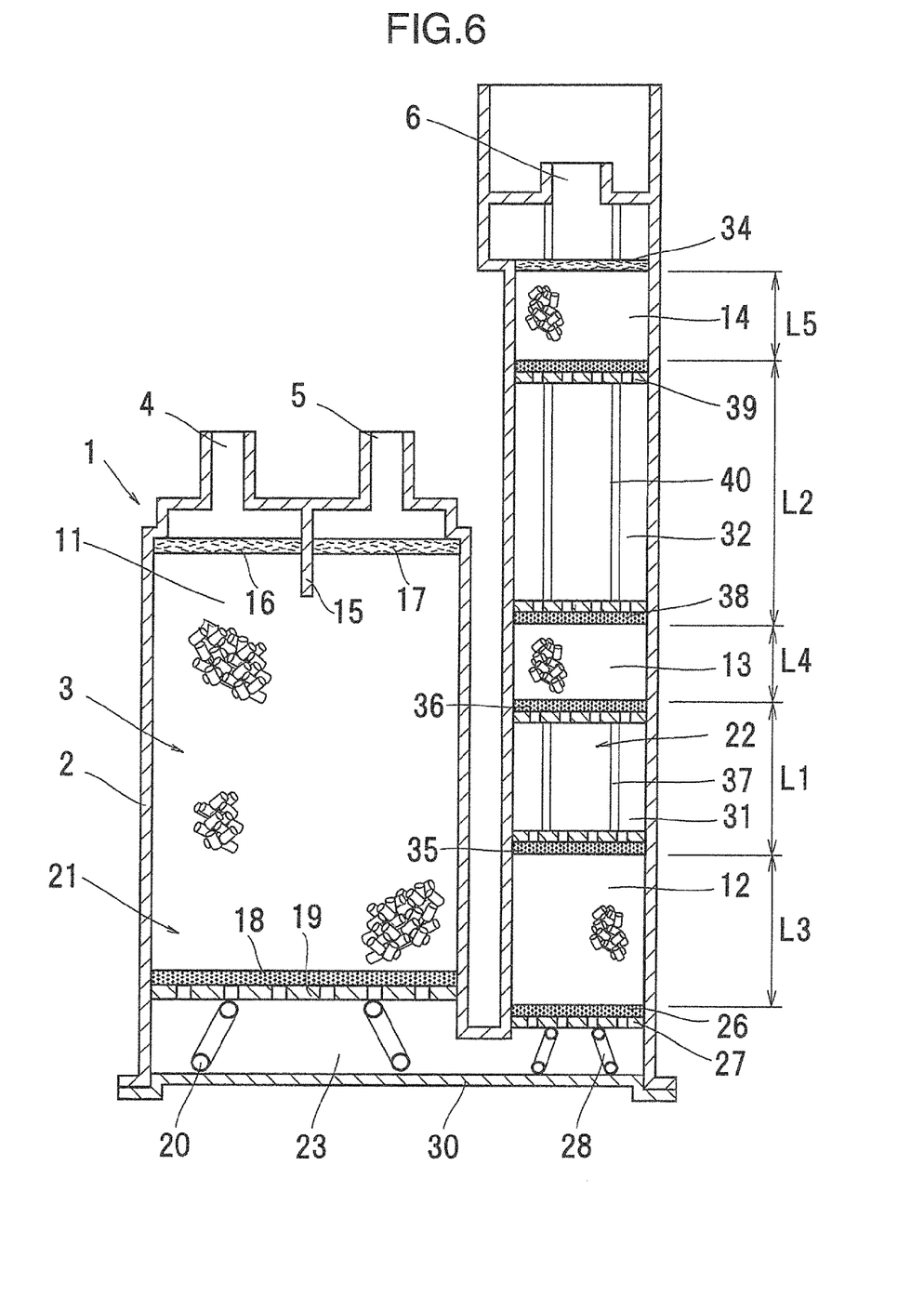
FIG. 6 is an example schematic view for explaining an evaporation fuel processing device according to Embodiment 6 of the present invention.

For example, as shown in FIG. 6, the volume V3 of the fourth adsorbent layer 14 may be set larger than the volume V2 of the third adsorbent layer 13 and smaller than the volume V1 of the second adsorbent layer 12.

Figure 7:
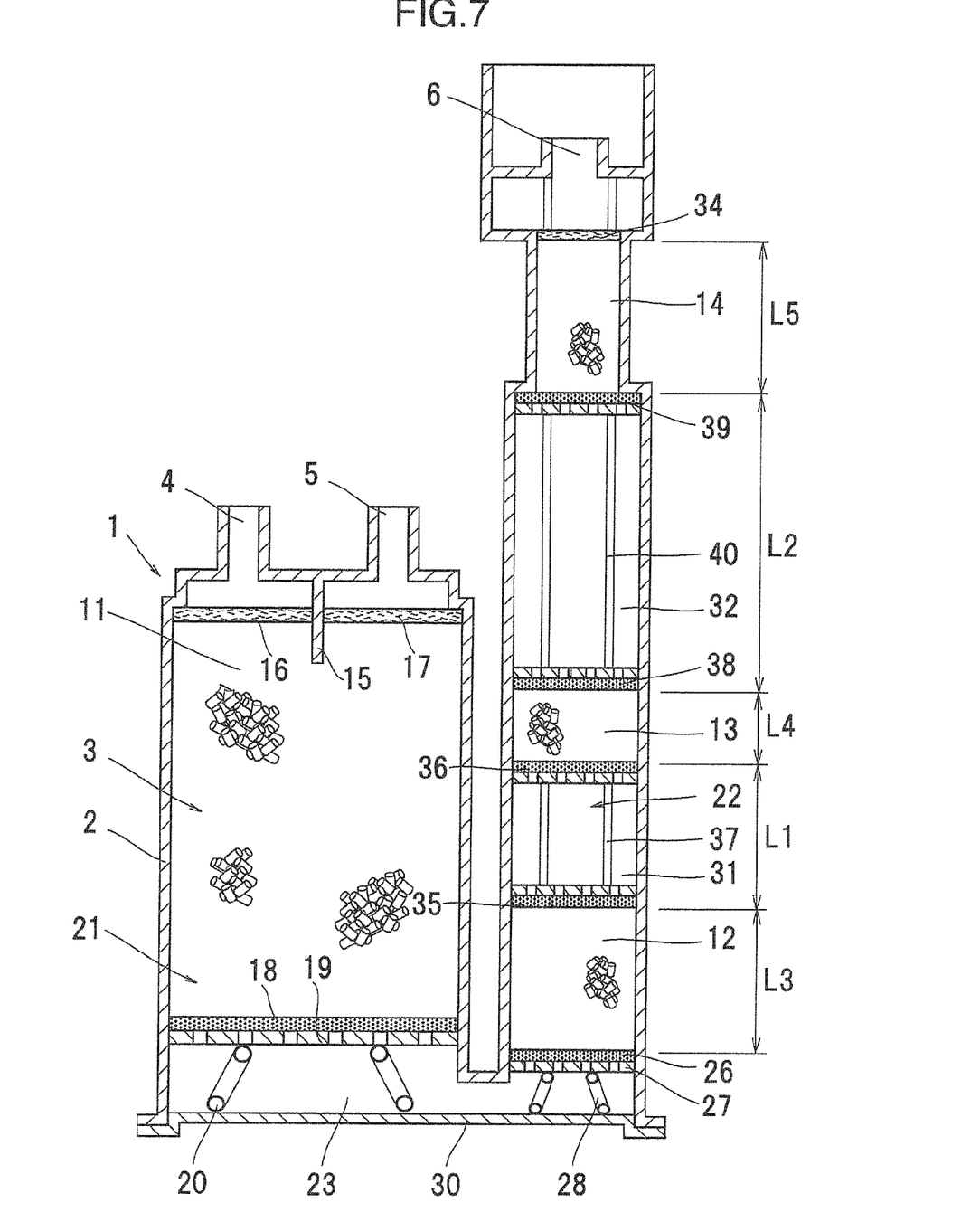
FIG. 7 is an example schematic view for explaining the evaporation fuel processing device according to Embodiment 6 of the present invention.

In addition, as shown in FIG. 7, in order to make a ratio L5/D in the fourth adsorbent layer 14 large, where L5 is the distance between the both end surfaces and D is a cross-sectional area perpendicular to the flow direction in the passage 3, the cross-sectional area D of the fourth adsorbent layer 14 may be set smaller, the volume V3 of the fourth adsorbent layer 14 may be set larger than the volume V2 of the third adsorbent layer 13 and smaller than the volume V1 of the second adsorbent layer 12, and the distance L5 between the both end surfaces of the fourth adsorbent layer 14 may be set longer than the distances L3 and L4 between the both end surfaces of the second adsorbent layer 12 and the third adsorbent layer 13, respectively. In this case, it is preferable to reduce the air-flow resistance in the fourth adsorbent layer 14 by, for example, uniformizing the direction of the granular activated carbon which is the adsorbent in the fourth adsorbent layer 14.

Other members which are the same as those in Embodiments 1 to 5 are denoted by the same reference numerals and a description thereof is omitted here.

In addition, the same operations and effects as in Embodiments 1 to 5 are obtained also in Embodiment 6.

Embodiment 7

In Embodiments 1 to 6, the volume of the separating part is set larger in the separating part farther on the side of the atmospheric air port 6 in the region. In this region, mutual relationships among the volumes of the separating parts 31 and 32 (V4 and V5) and the lengths (L1 and L2) are arbitrarily set, as long as the total volume of the adsorbent layers 12, 13, and 14 (V1+V2+V3) is set smaller than the total volume of the separating parts 31 and 32 (L4+L5), and preferably, the total of the distances between the both end surfaces of the adsorbent layers in the auxiliary chamber 42 (L3+L4+L5) is set shorter than the total of the separating distances between the adjacent adsorbent layers (L1+L2).

For example, the volume V5 of the second separating part 32 may be set larger than the volume V4 of the first separating part 31, and the separation distance L2 between the third adsorbent layer 13 and the fourth adsorbent layer 14 (length of the second separating part 32) may be set smaller than the separation distance L1 between the second adsorbent layer 12 and the third adsorbent layer 13 (length of the first separating part 31).

For example, the volume V5 of the second separating part 32 may be set smaller than the volume V4 of the first separating part 31, and the separation distance L2 between the third adsorbent layer 13 and the fourth adsorbent layer 14 (length of the second separating part 32) may be set smaller than the separation distance L1 between the second adsorbent layer 12 and the third adsorbent layer 13 (length of the first separating part 31).

Other members which are the same as those in Embodiments 1 to 6 are denoted by the same reference numerals and a description thereof is omitted here.

In addition, the same operations and effects as in Embodiments 1 to 6 are obtained also in Embodiment 7.

Other Embodiments

While only the first adsorbent layer 11 is provided in the main chamber 21 in Embodiments 1 to 7, a plurality of adsorbent layers may be provided in the main chamber 21, and between the adjacent adsorbent layers, the separating part for separating them may be provided.

Further, four or more adsorbent layers may be serially disposed in the auxiliary chamber 22, and between the adjacent adsorbent layers, the separating part for separating them may be provided. In this case, a total volume of the adsorbent layers in the auxiliary chamber 22 is set smaller than a total volume of the separating parts.

Moreover, it is preferable that the volume of the adsorbent layer in the auxiliary chamber 22 is set smaller in the adsorbent layer farther on the side of the atmospheric air port 6, the volume of the separating part in the auxiliary chamber 22 is set larger in the separating part farther on the side of the atmospheric air port 6, the total volume of the adsorbent layers in the auxiliary chamber 22 is set smaller than the total volume of the separating parts, the distance between the both end surfaces of the adsorbent layer in the auxiliary chamber 22 is set shorter in the adsorbent layer farther on the side of the atmospheric air port 6, the separation distance between the adjacent adsorbent layers in the auxiliary chamber 22 is set longer in the separating part farther on the side of the atmospheric air port 6, and the total of the distances between the both end surfaces of the adsorbent layers in the auxiliary chamber 22 is set shorter than the total of the separation distances between the adjacent adsorbent layers.

As long as the auxiliary chamber, which is the region that includes three or more adsorbent layers and the separating parts for separating the adjacent adsorbent layers, and in which the total volume of the adsorbent layers is set smaller than the total volume of the separating parts, is provided on the side of the atmospheric air port 6, the shape of the entire evaporation fuel processing device, and the number, shape, the arrangement, etc. of the adsorbent layer, the separating part, the space, and the like can be arbitrarily set.

The invention claimed is:

1. An evaporation fuel processing device, comprising:
    a passage formed inside so as to allow a fluid to flow through the passage;
    a tank port and a purge port formed on one end side of the passage;
    an atmospheric air port formed on the other end side of the passage; and
    adsorbent layers filled with adsorbent which can adsorb evaporation fuel components, the adsorbent layers being provided in the passage;
    wherein a region, which comprises three or more adsorbent layers and separating parts for separating the adjacent adsorbent layers, and in which a total volume of the adsorbent layers is set smaller than a total volume of the separating parts, is provided on a side of an atmospheric air port of the passage.

2. The evaporation fuel processing device according to claim 1, wherein, in the region, a total of distances between both end surfaces of the adsorbent layers is set shorter than a total of separation distances between the adjacent adsorbent layers.

3. The evaporation fuel processing device according to claim 1, wherein, in the region, the separation distance between the adjacent adsorbent layers is set longer in the separating part closer to the atmospheric air port.

4. The evaporation fuel processing device according to claim 1, wherein, in the region, the volume of the separating part is set larger in the separating part closer to the atmospheric air port.

5. The evaporation fuel processing device according to claim 1, wherein, in the region, the distance between the both end surfaces of the adsorbent layer is set shorter in the adsorbent layer closer to the atmospheric air port.

6. The evaporation fuel processing device according to claim 1, wherein, in the region, the volume of the adsorbent layer is set smaller in the adsorbent layer closer to the atmospheric air port.

7. The evaporation fuel processing device according to claim 1, wherein, in the region, the adsorbent layer located nearest to the atmospheric air port is constituted of activated carbon having a butane working capacity of 14.5 g/dL or higher in accordance with ASTM D5228.

8. The evaporation fuel processing device according to claim 1, wherein, the adsorbent layer disposed nearest to the tank port is constituted of pulverized coal.

9. The evaporation fuel processing device according to claim 1, wherein, the volume of the adsorbent layers in the region is 12% or less of a total volume of the adsorbent layers in the evaporation fuel processing device.

10. The evaporation fuel processing device according to claim 1, wherein, a ratio of a cross-sectional area, perpendicular to a flow direction in the passage, of the adsorbent layers in the region to a cross-sectional area, perpendicular to the flow direction in the passage, of the adsorbent layer outside the region in the evaporation fuel processing device falls within a range of 1:2.5 to 1:4.5.

* * * * *